United States Patent [19]

Saeki et al.

[11] Patent Number: 4,797,011
[45] Date of Patent: Jan. 10, 1989

[54] SOLID LUBRICANT BEARING

[75] Inventors: Hiroshi Saeki, Ibaraki; Teruo Maruyama, Hirakata, both of Japan

[73] Assignee: Matsushita Electric Industrial Co., Ltd., Kadoma, Japan

[21] Appl. No.: 141,741

[22] Filed: Jan. 11, 1988

[30] Foreign Application Priority Data

Jan. 12, 1987 [JP] Japan .................................. 62-4358

[51] Int. Cl.[4] ........................ F16C 29/04; F16C 33/46
[52] U.S. Cl. ........................................ 384/13; 384/47; 384/54; 384/463; 384/470; 384/912; 384/913
[58] Field of Search ..................... 384/13, 54, 47, 463, 384/470, 912, 913

[56] References Cited

U.S. PATENT DOCUMENTS

| | | | |
|---|---|---|---|
| 2,969,264 | 1/1961 | Lamson et al. | 384/463 |
| 3,212,832 | 10/1965 | Mayer et al. | 384/470 |
| 4,500,144 | 2/1985 | de Campos | 384/463 |
| 4,534,871 | 8/1985 | Johnson | 384/463 |

Primary Examiner—Lenard A. Footland
Attorney, Agent, or Firm—Cushman, Darby & Cushman

[57] ABSTRACT

A solid lubricant bearing comprises plural rollers disposed in a line or in a circle, plural solid lubricant elements at least one thereof contacting one of the rollers beings pressed by springs on the rollers, and a guiding base for receiving the rollers to roll thereon has a solid lubricant film formed on its roller receiving face.

9 Claims, 8 Drawing Sheets

SOLID LUBRICANT BEARING

FIELD OF THE INVENTION AND RELATED ART STATEMENT

1. Field of the Invention

The present invention relates to a solid lubricant bearing, and especially relates to an improved solid lubricant bearing to be used in a special emvironment wherein a grease lubrication, air or fluid bearing can not be adopted.

2. Description of the Related Art

Recently, a solid lubricant bearing is used for apparatuses relevant to vacuum and astronautic, and appratuses used under a condition of high temperature or very low temperature and under a clean atmosphere and the like. And especially, the solid lubricant bearing is becoming to be used more and more for a manufacturing apparatus of semiconductor device and its peripheral equipments. So the reliability of the solid lubricant bearing is a matter to be improved.

A conventional solid lubricant bearing is described with reference to FIG. 14, FIG. 15, FIG. 16 and FIG. 17.

FIG. 14 shows a cross-sectional side view of a typical constitution of a conventional solid lubricant bearing. FIG. 15 shows a cross-sectional side view of an example of conventional solid lubricant ball bearing. FIG. 16 shows a cross-sectional plan view of the conventional solid lubricant ball bearing shown in FIG. 15. FIG. 17 shows a perspective view of another example of a conventional solid lubricant cross-roller bearing.

In FIG. 14, the conventional solid lubricant bearing has plural rollers 1 (though there are plural ones, only one rollers is shown in the figure); a holder 2 is provided for holding plural rollers 1 in a line or in a circle; a guiding base 3 has a roller receiving face 3a with a solid lubricant film 4 firmly bonded or formed thereon. The rollers 1 roll on the surface of the solid lubricating film 4.

In FIGS. 15 and 16, the conventional solid lubricant ball bearing comprises plural balls 5 which are disposed in a circle, holders 6 and 7 for holding the plural balls 5 in a circle with previously selected distances, plural screws 8 for fixing the holders 6 and 7 in one body and inner wheels 9 and outer wheels 10 forming the roller receiving faces 9a and 10a having the solid lubricant films 4 thereon. The balls 5 roll on the surfaces of the solid lubricant films 4.

In FIG. 17, the conventional solid lubricant cross roller bearing comprises plural cylindrical rollers 11, a holder 12 for holding the plural cylindrical rollers 11 alternately inclined in the symmetrical direction and a pair of guide rails 13 and 14 respectively having roller receiving faces 15, 15 having the solid lubricant films 4 thereon. And the cylindrical rollers 11 roll on the solid lubricant film 4.

Function of the conventional solid lubricant bearing having the above-mentioned constitutions is described in the following.

At first, when the roller 1 rolls in the countercrock direction shown by arrow A in FIG. 14 without any slippage, the guiding base 3 moves relatively in the direction shown by arrow B. At that time, the roller 1 and the guiding base 3 move smoothly by the action of the solid lubricant film 4. Above is the principle of the solid lubricant ball bearing shown in FIG. 16 and the solid lubricant cross-roller bearing shown in FIG. 17.

The inner wheel 9 rotates in either one of the crockwise direction D and the countercrockwise direction C, and the outer wheel 10 rotates in the relatively opposite direction relatively in FIG. 16. The guide rail 13 linearly moves in either one of the directions shown by arrows E and F in FIG. 17, and the guide rail 14 also linearly moves in the other direction relatively.

In the above-mentioned conventional solid lubricant bearings, the solid lubricant exists at a part where the base materials mechanically contacts, for example, at positions between the balls 5 and the inner and outer wheels 9 and 10 in FIG. 16 and between the cylindrical rollers 11 and the guiding rails 13 and 14 in FIG. 17. Therefore, the direct contact of the base materials and the extreme abrasion or seize of the base materials can be prevented by the lubricative action of the solid lubricant.

In the conventional solid lubricant bearing, the solid lubricant film may be partially peeled off by the friction. At that time, the insufficient lubrication due to peeling of the solid lubricant out of the bearing generally occurs in due course. And also the wear of the base material badly increases when the conventional solid lubricant bearing has been used.

As a result, there has been problems that the accuracy of the conventional solid lubeicating bearing becomes inferior or the loss of friction of the conventional solid lubricant bearings increases. And the lifetime of the conventional solid lubricant bearing is generally shorter than ordinal grease bearing and the like.

OBJECT AND SUMMARY OF THE INVENTION

The object of the present invention is to provide an improved solid lubricant bearing which maintains lubrication and accuracy of bearing for a long service time.

A solid lubricant bearing in accordance with the present invention comprises, plural rollers disposed in a line or in a circle, plural solid lubrication elements contacting rolling faces of the roller, plural elastic elements respectively for pressing the plural solid lubricant elements on respective rollers, at least one guiding member having at least one roller receiving face on which the roller roll, and at least one solid lubricant film formed on the roller receiving face.

By such constitution, as powder of the solid lubricant is continuously supplied by the scraping of the solid lubricant elements by the rollers, the scraped powder of the solid lubricant is supplied to the roller receiving face of the guiding member. As a result the lubrication and the accuracy of the bearing can be maintained when the solid lubricant film on the roller receiving face is peeled off.

BRIEF DESCRIPTION OF THE DRAWINGS

FIG. 6 (B) is a drawing showing a plan view of a solid lubricant element 44 in FIG. 6 (A).

DESCRIPTION OF THE PREFERRED EMBODIMENTS

Figure 1:
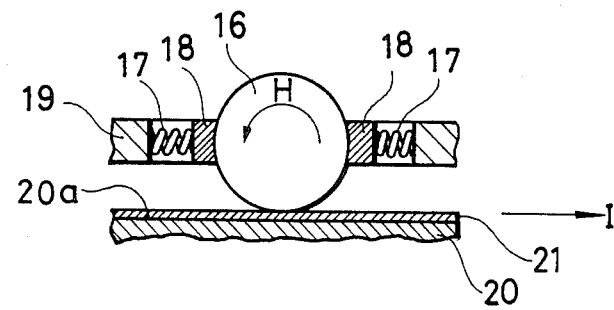
FIG. 1 is a drawing showing a cross-sectional side view of a typical constitution of a preferred embodiment of a solid lubricant bearing in accordance with the present invention.

A preferred embodiment of a solid lubricant bearing in accordance with the present invention is described with reference to FIG. 1. FIG. 1 shows a cross-sectional side view of the typical constitution of a part of the solid lubricant bearing of the present invention. In FIG. 1, a part of the solid lubricant bearing of the present invention comprizes plural rollers or rolling elements 16 such as balls or cylindrical rollers (though there are plural ones, only one roller is shown in the figure), a holder 2 holding plural rollers 16 in a line or in a circle, a guiding base 20 which provides a roller receiving face 20a, a solid lubricant film 21 formed on the roller receiving face 20a of the guiding base 20, plural solid lubricant elements 18, 18 and plural elastic elements such as springs 17, 17 for pressing the solid lubricant elements 18, 18 on the rolling faceof the rollers 16.

As a solid lubricant, molybdenum disulfide ($MoS_2$), tungsten disulfide ($WS_2$), gold ion doped or silver ion doped molybdenum disulfide ($MoS_2$) or tungsten disulfide ($WS_2$), composit of Ag, $WS_2$ and Co, or the like is used. Such material is plated on the roller receiving face 20a of the guiding base 20 by the ion plating method or sputtered thereon by the magnetron sputtering method.

When the rollers 16 roll in the countercrockwise direction shown by arrow H without any slippage, the guiding base 20 moves relatively in the direction shown by arrow I in FIG. 1. At that time, the solid lubricant elements 18, 18 are scraped little by little by the friction when the rollers 16 roll and the scraped powder of the solid lubricant is transmitted to the rolling face of the rollers 16. After that, the scraped powder of the solid lubricant which is transmitted on the rolling face of the rollers 16 is retransmitted and stuck on the surface of the solid lubricant film 21.

When the rollers 16 and the guiding base 20 move each other in opposite direction, the operation of the solid lubricant decreases the friction between the rollers 16 and the guiding base 20. And also, when the solid lubricant film 21 on the guiding base 20 is partially peeled off, the scraped powder of the solid lubricant from the solid lubricant elements 18 is filled into the peeled part the solid lubricant film 21. Therefore, the operation of the solid lubricant bearing is maintained for long use.

A working example of a solid lubricant ball bearing which is applicable to the above-mentioned solid lubricant bearing in accordance with the present invention is described with reference to FIG. 2 and FIG. 3.

Figure 2:
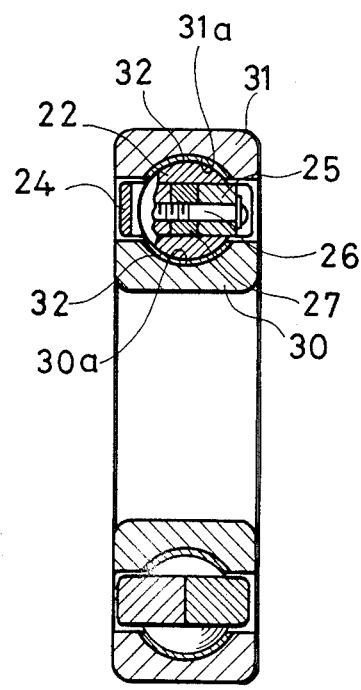
FIG. 2 is a drawing showing a cross-sectional side view of a working example of a solid lubricant ball bearing in accordance with the present invention.

FIG. 2 shows a cross-sectional side view of the solid lubricant ball bearing. FIG. 3 shows a cross-sectional plan view of the solid lubricant ball bearing shown in FIG. 2.

Figure 3:
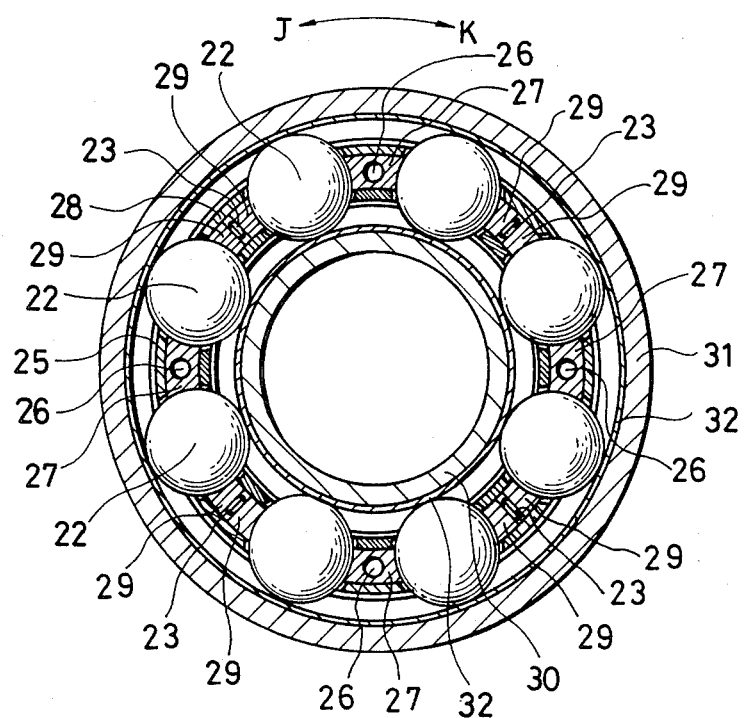
FIG. 3 is a drawing showing a cross-sectional plan view of the solid lubricant ball bearing shown in FIG. 2.

In FIG. 2 and FIG. 3, the solid lubricant ball bearing comprises plural balls 22 disposed in a circle, plate springs 23 as elastic elements, holders 24 and 25 for guiding the balls 22 in a circle, plural screws 26 for connecting the holders 24 and 25 in one body, plural solid lubricant elements 27 fixed on the holders 24 and 25 by the screws 26 at the same time, plural movable solid lubricant elements 29 which are guided in a circle by the holders 24 and 25 and pressed on the rolling faceof the balls 22 by pressure of the plate springs 23, an inner wheel 30 and an outer wheel 31 respectively having a roller receiving faces 30a and 31a and solid lubricant films 32 formed on surfaces of the roller receiving face 30a of the inner wheel 30 and the roller receiving face 31a of the outer wheel 31 on which the balls 22 roll.

When the inner wheel 30 or the outer wheel 31 rotates in the counterclockwise direction J or in the clockwise direction K, the balls 22 roll in the clockwise direction or in the counterclockwise direction. At that time, the solid lubricant elements 27 and 29 are pressed on the rolling face of the balls 22 along the circular guiding grooves 28 by the plate springs 23. And the solid lubricant elements 27 and 29 are continuously scraped little by little by the balls 22. The scraped powder of the solid lubricant is transmitted on the surface of the balls 22. And the scraped powder of the solid lubricant on the balls 22 is also retransmitted and stuck on to the surface of the solid lubricant films 32.

Figure 4:
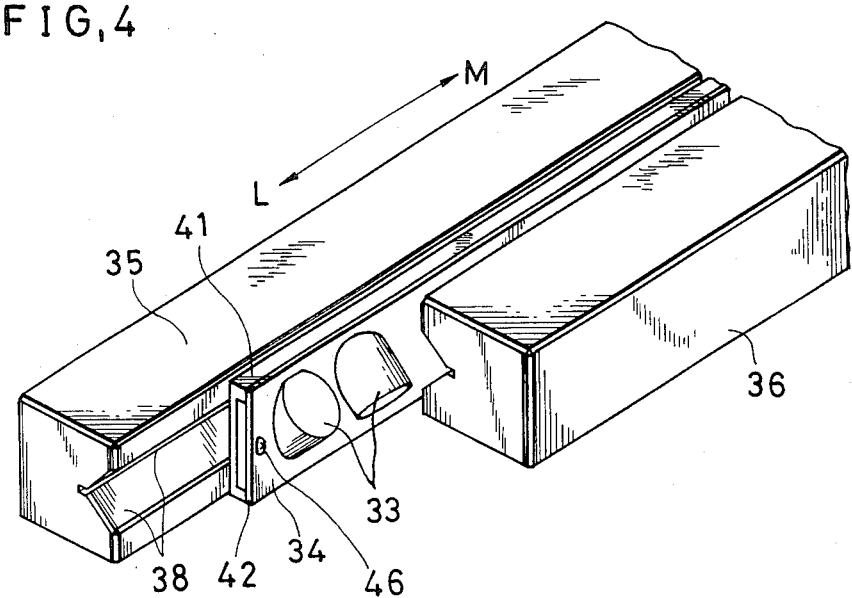
FIG. 4 is a drawing showing a perspective view of another working example of a solid lubricant cross-roller bearing in accordance with the present invention.
Figure 5:
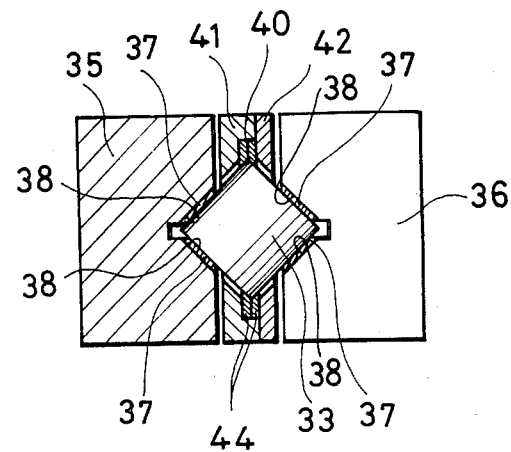
FIG. 5 is a drawing showing a cross-sectional side view of the solid lubricant cross-roller bearing shown in FIG. 4.
Figure 6B:
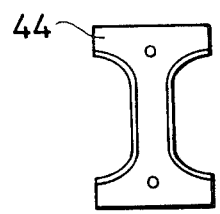
FIG. 6 (A) is a drawing showing a plan view of a roller holder of the solid lubricant cross-roller bearing shown in FIG. 4.
Figure 6A:
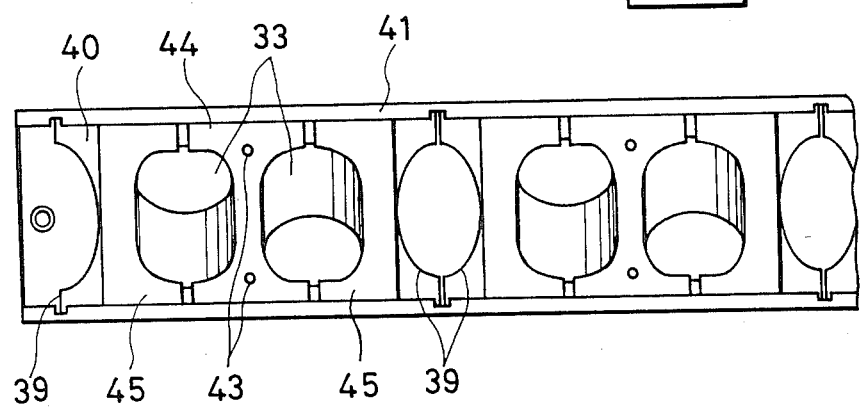

Another working example of a solid lubricant cross-roller bearing which is applicable to the solid lubricant bearing in accordance with the present invention is described with reference to FIG. 4, FIG. 5, FIG. 6 (A) and FIG. 6 (B). FIG. 4 shows a perspective view of the solid lubricant cross-roller bearing. FIG. 5 shows a cross-sectional side view of the solid lubricant cross-roller bearing shown in FIG. 4. FIG. 6 (A) shows a plan view of a part of the solid lubricant cross-roller bearing, especially, a part of a roller holder 34 for holding the cylindrical rollers 33 shown in FIG. 4. FIG. 6 (B) shows a plan view of a solid lubricant element 44 in FIG. 6 (A).

In FIG. 4, the solid lubricant cross-roller bearing comprises plural cylindrical rollers 33 whose axes are disposed alternately on respective two planes, for example, having right angle between each other, a roller holder 34 consisting of a housing 41 and a cover 42 which are connected in one body by screws 46 and a pair of guiding rails 35 and 36 respectively moves in opposing directions and respectively having roller receiving faces 38 on which the cylindrical rollers 33 roll.

In FIG. 5, solid lubricant films 37 are formed on respective roller receiving faces 38 of the guiding rails 35 and 36. And the roller holder 34 consisting of the housing 41 and the cover 42 have guiding grooves 40 for guiding fixed solid lubricant elements 44 and movable solid lubricant elements (not shown in the figure).

In FIG. 6 (A), plural fixed solid lubricant elements 44 are fixed on the housing 41 by pins 43 and plural movable solid lubricants 45 are respectively pressed on the rolling face of the cylindrical rollers 33 by plate springs 39 which serve as elastic elements. Detailed shape of the fixed solid lubricant element 44 is shown in FIG. 6 (B), the movable solid lubricant element 45 has substantially the same shape.

When the guiding rail 35 or 36 linearly moves in the direction shown by arrow L or M in FIG. 4, the cylindrical rollers 33 roll on the surface of the solid lubricant films 37 which are formed on the roller receiving faces 37 of the guiding rails 35 and 36. At that time, as the fixed solid lubricant elements 44 and the movable solid lubricant elements 45 contact the rolling faces of the cylindrical rollers 33, the fixed solid lubricant elements 44 and the movable solid lubricant elements 45 are continuously scraped little by little by friction of the cylindrical rollers 33. The scraped powder of the solid lubricant is transmitted on the rolling face of the cylindrical rollers 33 and also the scraped powder of the solid lubricant on the cylindrical rollers 33 are retransmitted and stuck to the surface of the solid lubricant films 37. Therefore, when the solid lubricant films 37 are partially peeled off, the scraped powder of the solid lubricant is supplemented to the peeled part of the solid lubricant films 37.

In the above-mentioned embodiments, the solid lubricant elements always contact the rollers such as balls or cylindrical rollers by pressure of the elastic elements such as springs. And the scraped powder of the solid lubricant is continuously supplied to the solid lubricant films and supplemented to the peeled part of the solid lubricant films. As a result, the above-mentioned solid lubricant bearings maintain the lubrication and the accuracy of the bearings for long service time.

Another preferred embodiment of a solid lubricant bearing in accordance with the present invention is described with reference to FIG. 7 and FIG. 8.

Figure 7:
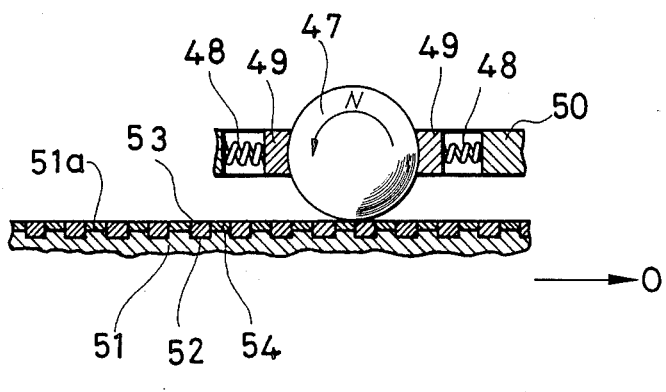
FIG. 7 is a drawing showing a cross-sectional side view of typical constitution of another preferred embodiment of a solid lubricant bearing in accordance with the present invention.

FIG. 7 shows a cross-sectional side view of a part of typical constitution of another preferred embodiment of the solid lubricant bearing in accordance with the present invention. FIG. 8 shows a plan view of the solid lubricant bearing shown in FIG. 7.

Figure 8:
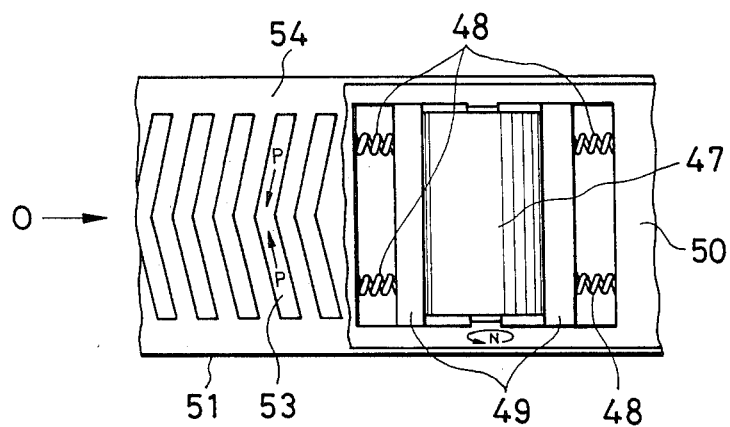
FIG. 8 is a drawing showing a plan view of the solid lubricant bearing shown in FIG. 7.

In FIG. 7 and FIG. 8, the solid lubricant bearing comprises plural cylindrical rollers 47, (though there are plural ones, only one the cylindrical roller is shown in the figure), solid lubricant elements 49, springs 48 as elastic member for pressing the solid lubricant elements 49 on the rolling face of the cylindrical rollers 47, a holder 50 for holding the cylindrical rollers 47, the solid lubricant elements 49 and the springs 48 and a guiding base 51 for providing a roller receiving face 51a. The guiding base 51 has plural shaped grooves 52 of V-letter shape inplan view on its face. Each V-letter shaped grooves 52 contain therein solid lubricant elements 53 of the same V-letter shape as the grooves 52 and a hard film 54 is formed on the roller receiving face 51a of the guiding base 51 except the parts of the V-letter shaped grooves 52.

As the hard film 54, titanium carbide (TiC), nickel chrominum (CrN) or a diamond-like carbon film is used. And as the solid lubricant element 53, molybdenum disulfide ($MoS_2$), tungsten disulfide ($WS_2$), gold ion doped or silver ion doped molybdenum disulfide ($MoS_2$) or tungsten disulfide ($WS_2$), composit of AG, $WS_2$ and Co, or like is used. The solid lubricant elements 53 are formed by plating one of the above-mentioned materials by using the ion plating method, or by sputtering by the magnetron sputtering method under the condition of masking the hard film 54.

When the cylindrical rollers 47 roll in the counterclockwise direction N in FIG. 7 without any slippage, the guiding base 51 moves linearly in the direction shown by the arrow O relatively. At that time, the solid lubricant elements 49 contact the rolling faces of the cylindrical rollers 47 and are scraped little by little by friction of the cylindrical rollers 47. And the scraped powder of the solid lubricant is transmitted to the rolling face of the cylindrical rollers 47. The scraped powder of the solid lubricant which has been transmitted to the rolling face of the cylindrical rollers 47 is supplemented to the surface of the solid lubricant elements 53 and the hard film 54 by the rotation of the cylindrical rollers 47.

Hereupon, when the supplemented scraped powder of the solid lubricant is supplied superfluously, such superfluous scraped powder of the solid lubricant is pushed in the direction shown by arrow P in FIG. 8. As a result, such wedge effect occurs, that the scraped powder of the solid lubricant under the cylindrical rollers 47 is pushed along the grooves 52 by pushing forces which are component of force induced by rolling motion of the cylindrical rollers 47 on the V-letter shaped grooves 52.

As mentioned above, the V-letter shaped grooves 52 are serially disposed in a line on the roller receiving face 51a of the guiding base 51, the solid lubricant elements 53 are contained therein and the hard film 54 is formed on the roller receiving face 51a of the guiding base 51 except the parts of the V-letter shaped grooves 52. Therefore, the lubrication between the hard film 54 and the cylindrical rollers 47 are improved by the wedge effect of the scraped powder of the solid lubricant. And also the accuracy of the bearing and the distance between the center of the cylindrical rollers 47 and the surface of the hard film 54 which is shown by arrow Q in FIG. 7 is maintained for long service time by the wearproof of the hard film 54.

Still other preferred embodiment of a solid lubricant bearing in accordance with the present invention is described with reference to FIG. 9, FIG. 10, FIG. 11, FIG. 12 and FIG. 13.

Figure 9:
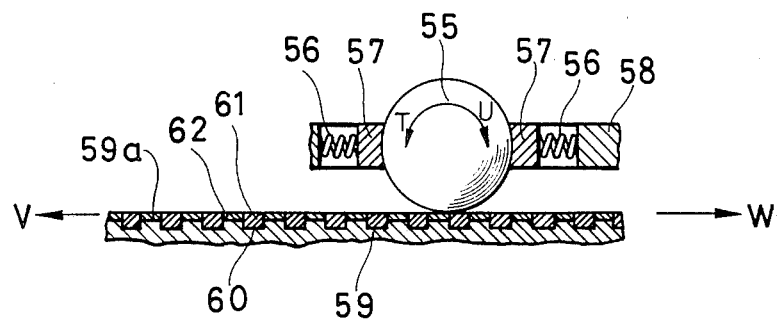
FIG. 9 is a drawing showing a cross-sectional side view of typical constitution of still other preferred embodiment of a solid lubricant bearing in accordance with the present invention.
Figure 10:
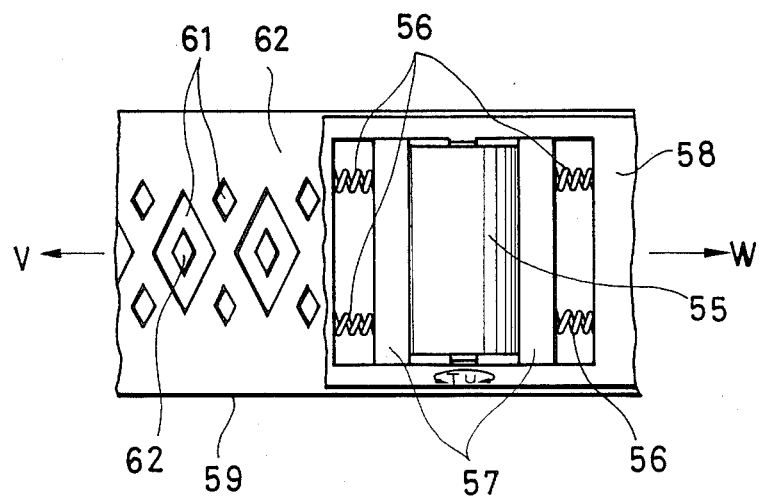
FIG. 10 is a drawing showing a plan view of the solid lubricant bearing shown in FIG. 9.
Figure 11:
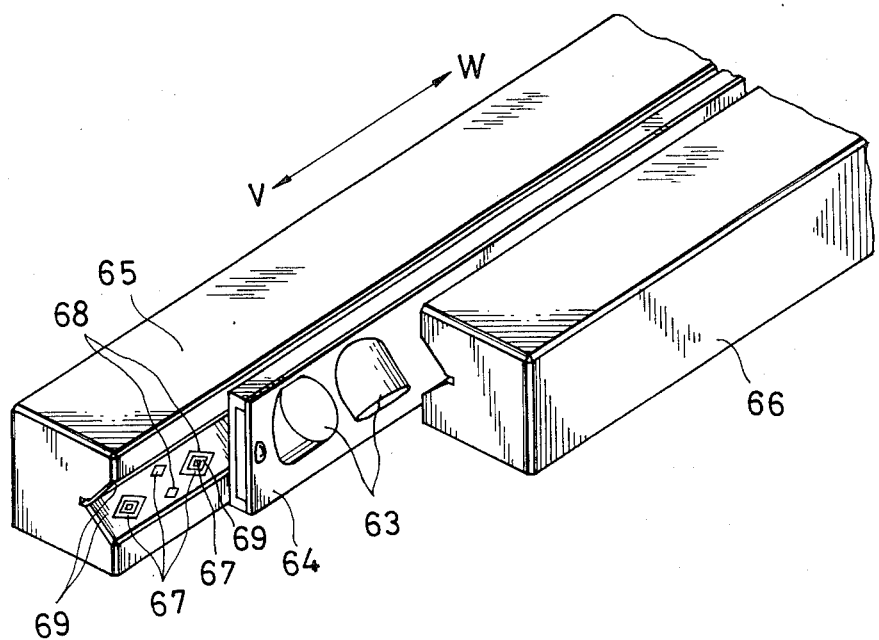
FIG. 11 is a drawing showing a perspective view of still other working example of a solid lubricant cross-roller bearing in accordance with the present invention.
Figure 12:
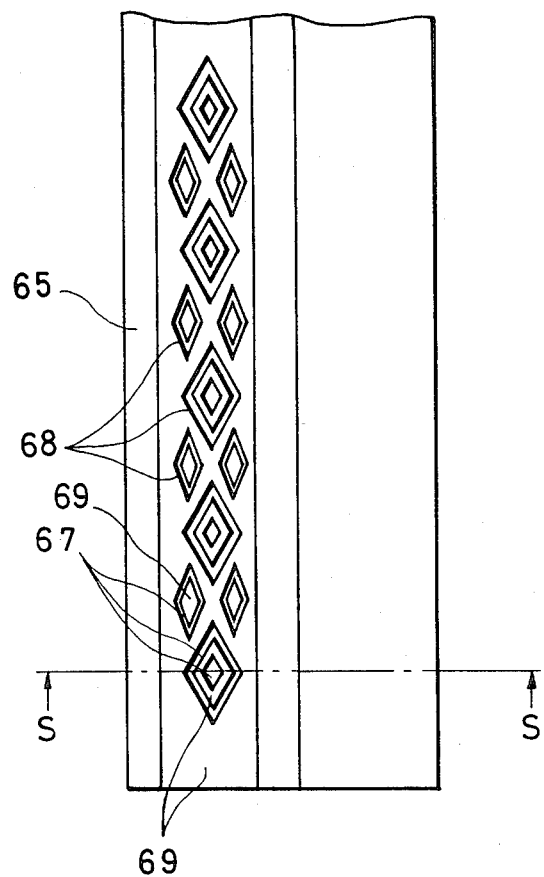
FIG. 12 is a drawing showing a plan view of a guiding rail of the solid lubricant cross-roller bearing shown in FIG. 11.
Figure 13:
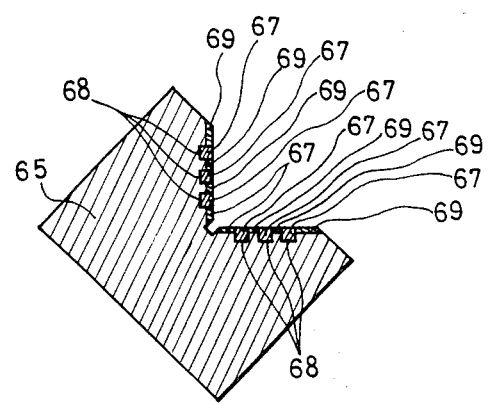
FIG. 13 is a drawing showing a cross-sectional side view of the guiding rail shown in FIG. 12.
Figure 14:
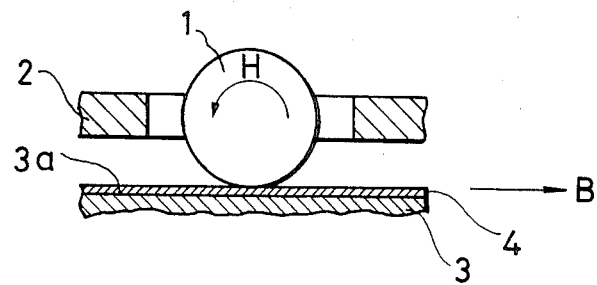
FIG. 14 is the drawing showing the cross-sectional side view of the typical constitution of the conventional solid lubricant bearing.
Figure 15:
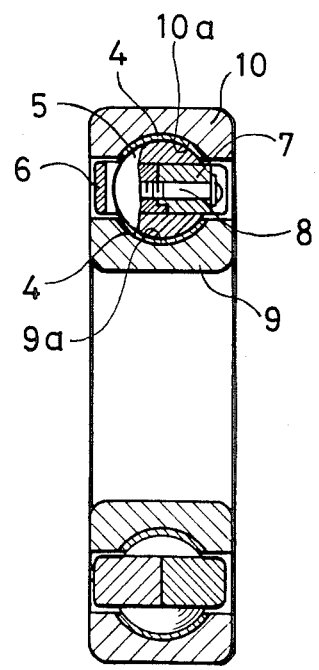
FIG. 15 is the drawing showing the cross-sectional side view of the conventional solid lubricant ball bearing.
Figure 16:
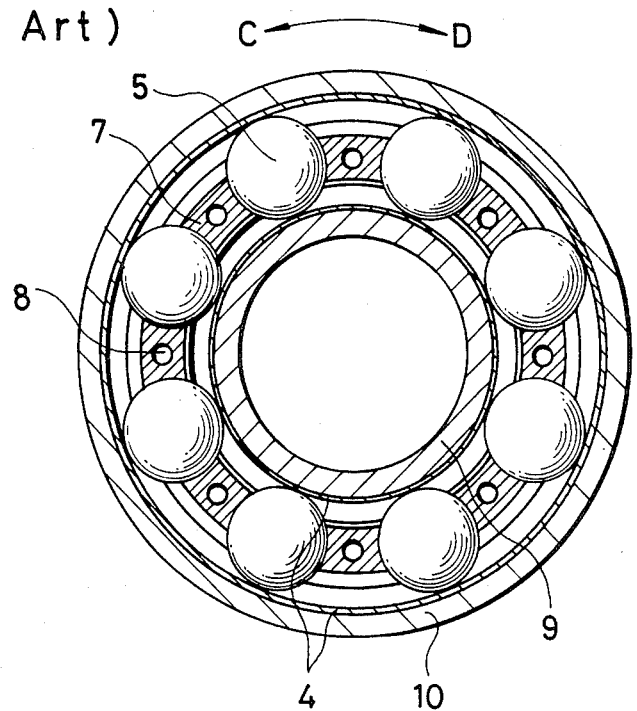
FIG. 16 is the drawing showing the cross-sectional plan view of the conventional solid lubricant ball bearing shown in FIG. 15.
Figure 17:
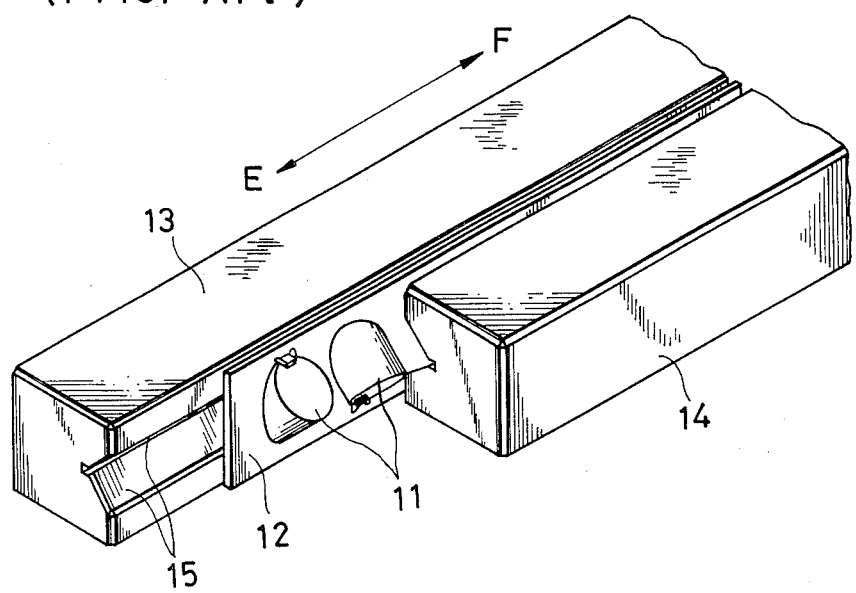
FIG. 17 is the drawing showing the perspective view of the conventional solid lubricant cross-roller bearing.

FIG. 9 shows a cross-sectional side view of a still other preferred embodiment of the solid lubricant bearing in accordance with the present invention. FIG. 10 shows a plan view of the solid lubricant bearing shown in FIG. 9. FIG. 11 shows a perspective view of still other working example of a solid lubricant cross-roller bearing applicable to the embodiment of the solid lubricant bearing shown in FIG. 9. FIG. 12 shows a plan view of a guiding rail of the solid lubricant cross-roller bearing shown in FIG. 11. FIG. 13 shows a cross-sectional side view of the guiding rail shown in FIG. 11.

In FIG. 9 and FIG. 10, the solid lubricant bearing comprises plural cylindrical rollers 55 (though there are plural ones, only one cylindrical roller 55 is shown in the figure), solid lubricant elements 57, springs 56 as elastic members for pressing the solid lubricant elements 57 on the rolling face of the cylindrical rollers 55, a holder 58 for holding the cylindrical rollers 55, the solid lubricant elements 57 and the springs 56 and a guiding base 59 for providing a roller receiving face 59a. In FIG. 9, the roller receiving face 59a of the guiding base 59 has plural rhombic or square recesses or rhombic or square shaped grooves 60 on its surface, for containing solid lubricant elements 61 having the same shape as the rhombic or square recesses or rhombic or square shaped grooves 60. And a hard film 62 is formed on the roller receiving face 59a of the guiding base 59 except the part of the rhombic or square recesses or rhombic or square shaped grooves 60. The materials of the solid lubricant elements 57 and 61 and the hard film 62 are the same as those of the above-mentioned embodiments.

In FIG. 11, the solid lubricant cross-roller bearing has plural cylindrical rollers 63 whose axes are disposed alternately on respective two planes, for example, having right angle between each other, a roller holder 64 and a pair of guiding rails 65 and 66. The roller holder 64 has the same constitution as that of the roller holder 34 in FIG. 4 which details are shown in FIG. 5 and FIG. 6. The guiding rails 65 and 66 have respectively roller receiving faces 69 which have plural rhombic recesses or rhombic shaped grooves 68. And the solid lubricant elements 67 having the same shape as the rhombic recesses or rhombic shaped grooves 68 are contained therein.

The operation of this embodiment is substantially the same as the above-mentioned embodiments. Therefore, the some description applies to the present embodiment, and the detailed description of the operation of this embodiment is omitted. The shape of the recesses 68 are formed as rhombic or square, and it is possible to arrange as shown in FIG. 12. As a result, the cylindrical rollers 63 can roll in both of the clockwise direction and the counterclockwise direction. And the guiding rails 65 and 66 can linearly move in the directions V and W in FIG. 11.

In the above-mentioned embodiments, both of balls or cylindrical rollers are usable as rollers. Needle shaped rollers, cone or tapered rollers, also, can be replaced to the balls or the cylindrical rollers.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

We claim:

1. A solid lubricant bearing comprising:
   plural rollers disposed in a line or in a circle,
   plural solid lubrication elements contacting rolling faces of said rollers,
   plural elastic elements respectively for pressing said plural solid lubrication elements on respective rollers,
   at least one guiding member having at least one roller receiving face on which said rollers roll, and
   at least one solid lubricant film formed on said roller receiving face.

2. A solid lubricant bearing in accordance with claim 1, wherein
   said rollers are balls or cylindrical rollers.

3. A solid lubricant bearing in accordance with claim 1, wherein
   said solid lubricating elements and said lubricant film are one of molybdenum disulfide ($MoS_2$), tungsten disulfide ($WS_2$), gold ion doped or silver ion doped molybdenum disulfide ($MoS_2$) or tungsten disulfide ($WS_2$), and composit of Ag, $WS_2$ and Co.

4. A solid lubricant bearing comprising:
   plural rollers disposed in a line or in a circule,
   plural solid lubrication elements contacting rolling faces of said rollers,
   plural elastic elements respectively for pressing said plural solid lubricant elements on respective rollers,
   at least one guiding member having at least one roller receiving face on which said rollers roll and having at least one groove on said roller receiving face, solid lubricant material is filled therein, and
   at least one hard film formed on said roller receiving face except a part of said groove.

5. A solid lubricant bearing in accordance with claim 4, wherein
   said rollers are balls or cylindrical rollers.

6. A solid lubricant bearing in accordance with claim 4, wherein
   said groove on said roller receiving face is formed in a direction for concentrating scraped powder of solid lubricant when said solid lubricant elements are scraped by rolling of said rollers.

7. A solid lubricant bearing in accordance with claim 4, wherein
   said solid lubricating elements and said lubricant film are one of molybdenum disulfide ($MoS_2$), tungsten disulfide ($WS_2$), gold ion doped or silver ion doped molybdenum disulfide ($MoS_2$) or tungsten disulfide ($WS_2$), and composit of Ag, $WS_2$ and Co.

8. A solid lubricant bearing in accordance with claim 4, wherein
   said hard film is one of titanium carbide (TiC), nickel chromium (CrN) and diamond-like carbon film.

9. A solid lubricant bearing in accordance with claim 4, claim 5, claim 6, claim 7 or claim 8, wherein
   said groove is rhombic or square shaped.

* * * * *